United States Patent
Wohlfahrt et al.

(10) Patent No.: US 11,707,967 B2
(45) Date of Patent: Jul. 25, 2023

(54) SUN SENSOR

(71) Applicant: Casco Schoeller GmbH, Frankfurt am Main (DE)

(72) Inventors: Nadine Wohlfahrt, Goldbach (DE); Scott Brown, Frankfurt am Main (DE); Markus Jaax, Frankfurt am Main (DE)

(73) Assignee: Casco Schoeller GmbH, Frankfurt am Main (DE)

( * ) Notice: Subject to any disclaimer, the term of this patent is extended or adjusted under 35 U.S.C. 154(b) by 378 days.

(21) Appl. No.: 16/922,191

(22) Filed: Jul. 7, 2020

(65) Prior Publication Data

US 2021/0008954 A1  Jan. 14, 2021

(30) Foreign Application Priority Data

Jul. 9, 2019  (DE) .................... 10 2019 210 127.5

(51) Int. Cl.
| | |
|---|---|
| *B60H 1/00* | (2006.01) |
| *G01J 1/42* | (2006.01) |
| *G01K 13/00* | (2021.01) |
| *G01S 19/01* | (2010.01) |

(52) U.S. Cl.
CPC .............. *B60H 1/0075* (2013.01); *G01J 1/42* (2013.01); *G01K 13/00* (2013.01); *G01S 19/01* (2013.01)

(58) Field of Classification Search
CPC ........ B60H 1/0075; G01J 1/42; G01J 1/0204; G01J 1/0219; G01J 1/0271; G01J 2001/4266; G01J 1/4204; G01K 13/00; G01S 19/01; G01W 1/12
See application file for complete search history.

(56) References Cited

U.S. PATENT DOCUMENTS

| | | | |
|---|---|---|---|
| 5,181,654 A * | 1/1993 | Yoshimi | B60H 1/0075 126/573 |
| 5,553,661 A | 9/1996 | Beyerlein et al. | |
| 5,726,441 A | 3/1998 | Samukawa et al. | |
| 7,079,944 B2 * | 7/2006 | Litchfield | G01S 5/163 701/513 |
| 9,879,884 B2 * | 1/2018 | Maxey | G01S 3/7861 |
| 2004/0226708 A1 | 11/2004 | Gutbrod et al. | |
| 2015/0096733 A1 | 4/2015 | Kakade et al. | |
| 2017/0102327 A1 | 4/2017 | Gohmann et al. | |
| 2019/0049292 A1 | 2/2019 | Poutiatine | |
| 2019/0323884 A1 | 10/2019 | Simeone | |

FOREIGN PATENT DOCUMENTS

| | | |
|---|---|---|
| CN | 101052863 A | 10/2007 |
| CN | 106840385 B | 6/2017 |
| CN | 108700458 B | 10/2018 |
| DE | 10155410 C1 | 9/2003 |
| DE | 102006029545 A1 | 12/2007 |
| DE | 102009007521 | 8/2010 |
| DE | 102016113940 A1 | 2/2018 |
| DE | 102017220377 A1 | 5/2019 |

* cited by examiner

*Primary Examiner* — Seung C Sohn
(74) *Attorney, Agent, or Firm* — Smartpat PLC

(57) ABSTRACT

A sensor (2) for determining solar altitude information includes at least one diode (24) for measuring sun intensity. A computation module (20) has interfaces (72, 74) at its input side for time- and location-based data for determining the current sun position from said location-based data, said time-based data and sun intensity measured and for providing a sun output signal on an output interface (80).

13 Claims, 2 Drawing Sheets

SUN SENSOR

TECHNICAL FIELD

The disclosure relates to a sensor for determining solar altitude information, comprising at least one diode for measuring sun intensity. It further relates to a method of controlling an air-conditioning unit of a motor vehicle, wherein said sun intensity is measured by a sensor.

BACKGROUND

In order to carry out optimized temperature control in an air-conditioning unit/multi-zone air-conditioning unit, it is necessary to take current solar radiation into account, which can be conducted at least partially by a sensor. 3D sensors detecting the position of the sun and intensity of solar radiation by use of several photodiodes are known in the art. But due to the car body, in particular the photodiode facing backwards can detect sun intensity to a limited extent only. Moreover, such varying orientation of these various photodiodes requires a hemispherical sensor cap design. According to one example, each of the photodiodes generates an analog signal of a voltage value. The various voltage values are transferred to the control device of the car which on this basis computes the position of the sun. The sensor can also compute the position of the sun by means of a microcontroller.

The disadvantage of such sensors is that they need a large installation space due to the use of a plurality of photodiodes facing in different orientations. Often, such installation space is not available or mounting these sensors making them clearly visible from outside is not desired in terms of design.

Furthermore, sensors are known which provide only one single analog sun intensity signal and transfer the latter to the control device of the motor vehicle. In order to detect the position of the sun, the control device additionally uses a GPS signal which is made available by a navigation device.

U.S. Pat. No. 5,553,661 describes a method using a correction signal of the sun position in order to control an air-conditioning unit by using sun sensors.

A disadvantage of such configurations is that the control device must be upgraded in order allow for computation of a signal adapted for the air-conditioning device, or it has to be implemented from the very beginning with significant costs and efforts.

SUMMARY

Therefore, the object of the disclosure is to provide a sensor which overcomes the disadvantages of the prior art. In particular, complex upgrades of the control device shall be avoided. Moreover, an enhanced method of control of the air-conditioning unit of a motor vehicle shall be provided.

This object is achieved with respect to said sensor in that a computation module is provided having interfaces at its input side for time- and location-based data for determining the current sun position respectively a sun position signal from said location-based data, said time-based data and measured sun intensity measured and for providing a sun output signal, in particular for controlling said air-conditioning unit of a motor vehicle on an output interface.

Advantageous Embodiments are the Object of the Dependent Claims.

The invention is based on the consideration that solar radiation for state-of-the art air-conditioning units is an extremely important control quantity. The vehicle passengers' heat perception depends both locally on ambient air temperature as on heat radiation received directly through the windows. In addition, the car body heats up on its side faced towards the sun, thereby potentially resulting into additional local heating of its inner space.

In order to be able to take into account such local and asymmetric effects with respect to the driver cabin in an air-conditioning unit, the air-conditioning unit needs information on the position of the sun in the sky and on the sun intensity. In the framework of the application, both are also denominated together as sun position signal. Such signal can be computed in the control device of the car which comprises for example a GNNS system, in particular GPS or Galileo. If such functionality is not yet available in the control device, this requires upgrading, which is time consuming and cost expensive.

As has now been realized, time consuming and cost intensive modifications of the control device can be avoided by generating a signal by GNNS data and date data transferred to said sensor and which can be used directly for the air-conditioning unit. Thereby, said sensor is configured as an intelligent sensor which not only transfers values (sun intensity) measured directly, but which processes said signal of said sun intensity measurement with location and date data at the input side to an output signal. Then, this signal can be used directly to control the air-conditioning unit which can then take adequate action inside the motor vehicle. The output interface is part of said sensor.

The sun position signal comprises both the position of the sun in the sky as well as the sun intensity. Computation of this sun position signal is part of the intelligence of said sun sensor which is thereby configured as an intelligent sun sensor.

Advantageously, exactly one diode is provided to measure said sun intensity, i.e. such sensor comprises precisely one diode. For sun intensity measurement purposes, said diode is preferably configured to measure IR light. Said diode is preferably configured as a photodiode. Due to such intelligent configuration of said sensor, only one photodiode is necessary such that a plane sensor cap can be used. In a preferred embodiment, said sensor comprises at least one further additional diode to measure light other than IR light, in particular to measure visible light, in particular daylight. In other preferred embodiments, it comprises additional components, for example a LED or a temperature measurement device.

Preferably, said sun position output signal comprises azimuth angle (AZ), elevation angle (EL) and sun intensity.

Preferably, said location-based data comprise longitude and latitude. The current motor vehicle position is thereby represented by means of these two quantities. Advantageously, said location-based data are data provided by means of a GNNS system, in particular GPS or Galileo.

Said time-based data respectively date data preferably comprise: current time (time of day), day, month. In a particularly advantageous embodiment, such time-based data each comprise current values for time (time of day), day, month, and year.

In a preferred embodiment, said sensor has a casing and a planely configured sensor cap arranged thereon. Due to such planely configured sensor cap, said sensor can be mounted discreetly even on the outside of the car body.

Said sensor and/or said sensor casing are preferably configured in order to be mounted in or on a motor vehicle. To this effect, said sensor casing preferably has fasteners. These can comprise clips respectively means enabling a snap or clutch connection to said vehicle with adequate means. Retaining springs made of plastic material or metal can be provided, ensuring fixed attachment of said sensor. Said casing can also comprise holes and/or channels for screws such that said sensor can be screwed in or on said motor vehicle.

Each input-side and/or output-side interface is advantageously configured as a digital interface, in particular for a LIN bus (Local Interconnect Network Bus) or a CAN (Controller Area Network).

In one preferred embodiment, said sensor comprises at least one additional sensor from the group: ambient light sensor, temperature sensor, sensor for detecting windscreen temperature.

In another preferred embodiment, said sensor comprises at least one additional component from the group: WLAN antenna, alarm light element, battery charge status indicator.

This disclosure also relates to a motor vehicle having a sensor as described hereinabove and mounted respectively integrated in or on said motor vehicle. Preferably, said sensor is then electrically connected to said air-conditioning unit of said motor vehicle in order to transfer the sun output signal.

With respect to the method, die aforementioned object is solved by the invention by a sun position signal being computed in said sensor by means of said sun intensity measured and by means of provided time-based and location-based data and made available to said air-conditioning unit, in particular a motor vehicle. Said air-conditioning unit which is in particular a multi-zone air-conditioning unit of a motor vehicle, provides temperature control of ambient air in one or several zones in the inner space by means of such signal and instructions given by the driver and/or passengers. The preferred embodiments described in the context of said sensor correspond to the corresponding preferred embodiments of the method.

The advantages of this invention consist in particular in that, due to realization of a position being determined within said sensor, said air-control device in the motor vehicle respectively the car needs no or only slight adjustment. This reduces time and effort as well as costs for the car manufacturer. As only one diode needs to be used, said sensor, compared to sensors having a diode array, may be realized as a smaller one and having a plane sensor cap such that less construction space is necessary without negatively impacting the design of said motor vehicle.

The following detailed description is merely exemplary in nature and is not intended to limit the invention or the application and uses of the invention. Furthermore, there is no intention to be bound by any theory presented in the preceding background or the following detailed description.

BRIEF DESCRIPTION OF THE DRAWINGS

In all figures, the same elements are designated by the same reference numerals.

DETAILED DESCRIPTION

Figure 1:
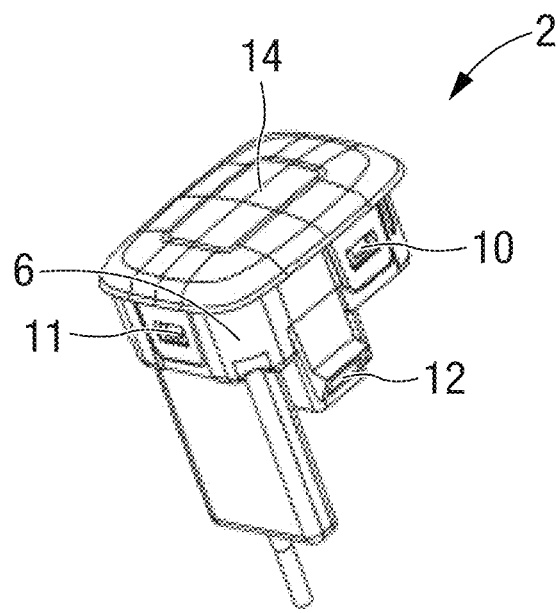
FIG. 1 shows a sensor in a first preferred embodiment in a perspective view.
Figure 2:
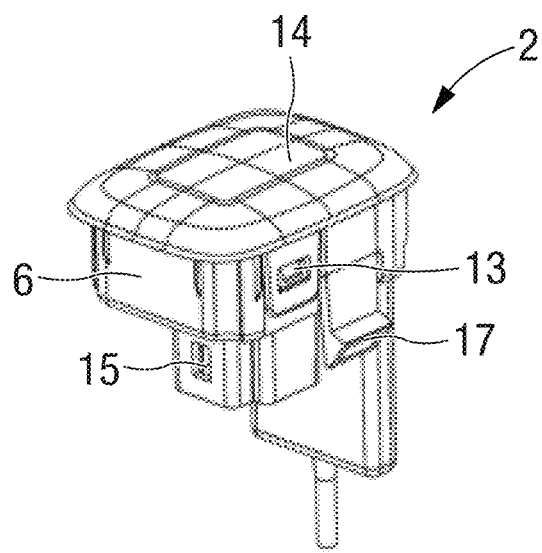
FIG. 2 shows said sensor according to FIG. 1 in a second perspective view.

A sensor 2 shown in FIG. 1 and in FIG. 2 in a preferred embodiment comprises a casing 6 having a connection 15 with a connector casing for a cable harness. Such connector 15 comprises interfaces 66, 72, 74, 80 according to FIG. 4. Casing 6 moreover has clutching clips 10, 11, 12, 13 in order to mount casing 6 and casing cap 14 as well as a clutching clip 17 in order to mount sensor 2 to an instrument panel.

Said casing 6 and/or said casing cap 14 are preferably made of PC (polycarbonate) respectively of material translucent for IR light, in particular macrolon. Said casing cap 14 is connected to said casing 6, preferably by a snap connection. Alternatively and/or additionally, screwing and/or bonding can also be provided.

In said casing 6, a computation module 20 (cf. FIG. 4) is arranged, connected to a photodiode 24 at the input side which is arranged under said casing cap 14. Said photodiode 24 measures sun intensity. Due to configuration of sensor 2 as described in the context of FIG. 4, only one photodiode 24 is necessary in the represented preferred embodiment.

Said sensor 2 is preferably mounted in the front car dashboard in a motor vehicle. Alternatively, it can also be mounted in the rear area of the passenger cabin, in particular in the area of the rear window shelf. Outer mounting on the motor vehicle, for example in or on the antenna, is also possible. Said casing cap 14 is preferably configured planely such that sensor 2 attracts almost no attention.

Figure 3:
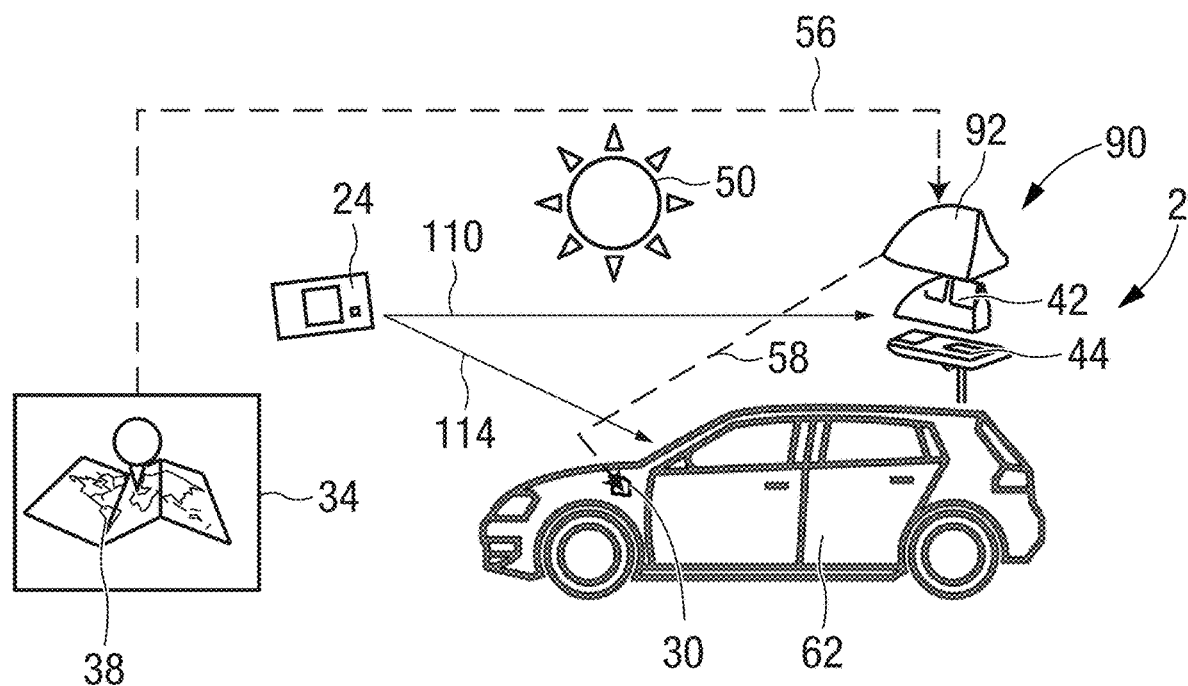
FIG. 3 shows a schematic diagram for use of a sensor.

FIG. 3 represents cooperation of photodiode 24 of said sensor 2 respectively sun sensor with said air-conditioning unit 30 and a control device 34 of a motor vehicle 62. Motor vehicle 62 comprises an antenna device 90 configured in the shape of a shark fin antenna 90. Said shark fin antenna 90 comprises a cap 92 made of material translucent for IR light, in particular of macrolon translucent for IR light. Said antenna device 90 comprises one antenna 42 configured for example as an LTE or GPS antenna, as well as a base part 44 comprising a printed circuit board. Photodiode 24 is preferably connected to said printed circuit board and said computation module and said interfaces are preferably integrated into said printed circuit board. Thereby, sensor 2 can be mounted to be invisible for the user and no additional casing will be necessary. Moreover, sensor 2 is not blocked by any components such that it will be able to measure solar radiation respectively intensity of sun radiation without any losses.

Positioning of sensor 2 in said antenna device 90 is indicated by means of an arrow 110. An arrow 114 symbolizes mounting of sensor 2 on said car dashboard within the passenger cabin of motor vehicle 62.

Sensor 2 measures sun intensity of sun 50. Control device 34 comprises a navigation system 38 having a GPS sensor and a date module providing current time, date, and month, i.e. respectively the current time, current day, and current month, preferably also the current year. Via a data connection 56, control device 34 transfers the date data time, date, month to sensor 2 as well as the current location of said motor vehicle determined by means of said GPS sensor and which is preferably transferred as a combination of longitude and latitude. Said intelligent sensor 2 processes said time-based and location-based data and therefrom determines the current sun position in the sky. It generates a sun position signal which comprises measured sun intensity and sun position, said sun position in the sky being preferably represented as an azimuth angle and an elongation angle. Via a data connection 58, sensor 2 transfers said signal to air-conditioning unit 30 of motor vehicle 62. Said air-conditioning unit/automatic equipment can set the temperature of ambient air in the inner space of said motor vehicle by means of said sun position signal.

Figure 4:
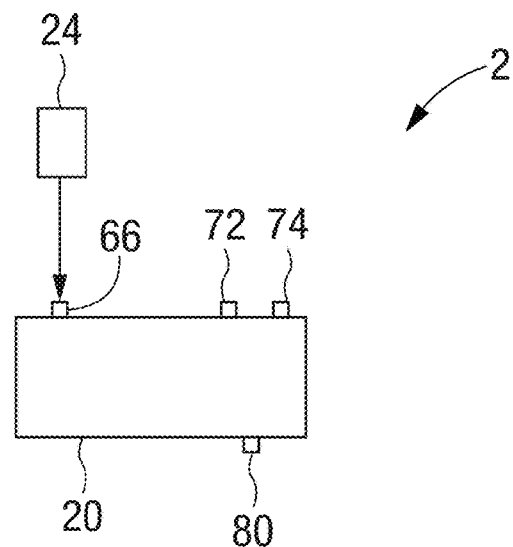
FIG. 4 shows a diagram of a sensor in a preferred embodiment.

FIG. 4 shows a schematic diagram of a sensor 2 configured as an intelligent sensor having a photodiode 24 and a computation module 20 to which photodiode 24 is connected by an interface 66 at said signal input side. Another interface 72 is provided, via which date data respectively location-based data, in particular current time, day, and month and preferably also the year (the current date) are transferred to computation module 20. In addition, a third interface 74 is provided, via which location-based data respectively location coordinates, in particular GNSS data, are transferred to said computation module 20.

Said time-based and location-based data are provided to sensor 2 preferably by means of control device 34 of said motor vehicle. Interfaces 66, 72 can be configured as a common interface via which both types of data are transferred.

Computation module 20 computes the current position of the sun in the sky as azimuth angle and elevation angle based upon said data information and location coordinates. Combined with the measured sun intensity, such angles are transferred as sun position signal via an interface respectively output interface 80 to an air-conditioning unit of said motor vehicle (cf. data connection 58 in FIG. 3). Interfaces 72, 74, 80 are preferably configured as LIN interfaces, i.e. as interfaces to a LIN bus.

As sensor 2 is configured as an intelligent sensor which does not only measure but also processes incoming signals, control device 34 does not need to be adjusted at all or only to a minimum extent in case of an upgrade of said motor vehicle 62 with this functionality. If not available, control device 34 needs only to be configured to transfer date data and location coordinates to said sensor, no implementation of a new functionality computing said sun position being required.

Sensor 2 delivers said integrated signal to the air-conditioning unit 30 which is used to take into account said sun position and intensity in order to carry out optimized setting of air-conditioning unit 30.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A sensor (2) for determining solar altitude information, comprising:
   at least one diode (24) for measuring sun intensity; and
   a computation module (20) having interfaces (72, 74) at its input side for time-based data and location-based data for determining the current sun position from said location-based data, said time-based data and said measured sun intensity and for providing a sun output signal on an output interface (80).

2. The sensor (2) according claim 1, wherein exactly one diode (24) is provided for measuring said sun intensity.

3. The sensor (2) according to claim 1, wherein said sun output signal comprises an azimuth angle (AZ), an elevation angle (EL), and said sun intensity.

4. The sensor (2) according to claim 1, wherein said location-based data comprise longitude and latitude.

5. The sensor (2) according to claim 1, wherein said time-based data comprise: current time, day, month.

6. The sensor (2) according to claim 1, wherein said sensor comprises a casing (6) and a planely configured sensor cap (14) arranged thereon.

7. The sensor (2) according to claim 1, wherein each of input-side and/or output-side interface is configured as digital interface.

8. The sensor (2) according to claim 1, wherein each of input-side and/or output-side interface is configured as digital interface for a LIN bus or CAN.

9. The sensor (2) according to claim 1, further comprising at least one additional sensor from the group consisting of an ambient light sensor, a temperature sensor, and a sensor for detecting windscreen temperature.

10. The sensor (2) according to claim 1, comprising at least one additional component from the group consisting of a WLAN antenna, an alarm light element, and a battery charge status indicator.

11. The sensor as in claim 1, wherein the sensor is mounted in a motor vehicle.

12. A method for controlling and/or setting an air-conditioning unit (30) of a motor vehicle (62), comprising:
    measuring a sun intensity by a sensor (2); and
    computing a sun output signal in said sensor (2) based on said measured sun intensity and
        based on provided time-based and location-based data; and
    providing the sun output signal to said air-conditioning unit (30).

13. An intelligent sensor (2), comprising:
    a casing (6) having a mounting clip (17) for mounting the intelligent sensor (2) in a front dashboard, in a rear window shelf, or in an antenna of a motor vehicle;
    a casing cap (14) connected to the casing (6) by clips (10, 11, 12, 13), the casing cap being made of a material translucent for infrared light;
    a computation module (20) arranged in the casing (6); and
    a photodiode (24) suitable for measuring sun intensity arranged under the casing cap (14) and operatively connected to the computation module (20),
    wherein the computation module (20) is configured to receive sun intensity data from the photodiode (24), location-based data in form of GNSS data through an interface, and
        time-based data in form of a current time, day, and month through the interface or a further interface,
    wherein the computation module (20) is configured to generate a sun position signal based upon the sun intensity data, the location-based data, and the time-based data, and
    wherein the computation module (20) is configured to transfer the sun position signal to an air-conditioning unit of the motor vehicle.

* * * * *